US010289397B2

(12) United States Patent
Shantharam et al.

(10) Patent No.: US 10,289,397 B2
(45) Date of Patent: May 14, 2019

(54) SILENT INSTALLATION OF SOFTWARE WITH DEPENDENCIES

(71) Applicant: AirWatch LLC, Atlanta, GA (US)

(72) Inventors: Shravan Shantharam, Cumming, GA (US); Greg Westerfield, Kennesaw, GA (US); Veeraiah Gorantla, Cumming, GA (US)

(73) Assignee: AirWatch LLC, Atlanta, GA (US)

( * ) Notice: Subject to any disclaimer, the term of this patent is extended or adjusted under 35 U.S.C. 154(b) by 211 days.

(21) Appl. No.: 15/083,620

(22) Filed: Mar. 29, 2016

(65) Prior Publication Data

US 2017/0286081 A1 Oct. 5, 2017

(51) Int. Cl.
*G06F 9/44* (2018.01)
*G06F 8/61* (2018.01)

(52) U.S. Cl.
CPC .................................... *G06F 8/61* (2013.01)

(58) Field of Classification Search
CPC ..... G06F 8/61; G06F 8/65; G06F 8/68; G06F 8/71; G06F 11/3051
See application file for complete search history.

(56) References Cited

U.S. PATENT DOCUMENTS

| 8,490,079 | B2 * | 7/2013 | Sugai | G06F 8/61 |
| | | | | 717/174 |
| 2008/0201705 | A1 * | 8/2008 | Wookey | G06F 8/68 |
| | | | | 717/175 |
| 2014/0380340 | A1 * | 12/2014 | Knichel | G06F 9/4411 |
| | | | | 719/327 |
| 2016/0342403 | A1 * | 11/2016 | Zamir | G06F 8/61 |
| 2017/0351507 | A1 * | 12/2017 | Shantharam | G06F 8/65 |

\* cited by examiner

*Primary Examiner* — Duy Khuong T Nguyen
(74) *Attorney, Agent, or Firm* — Thomas | Horstemeyer, LLP

(57) ABSTRACT

Disclosed are various examples for the silent installation of software and its dependencies using a single installation package file. A computing environment can generate a core installation package file that directs an installer application to silently install a secondary installer application and copy one or more installation package files to memory accessible by the secondary installer application. Thereafter, the secondary installer application identifies that a software dependency is required to be installed on the client device for a proper execution of a client application, identifies a respective installation package file that comprises the software dependency, and silently installs the software dependency using the respective installation package file.

20 Claims, 6 Drawing Sheets

SILENT INSTALLATION OF SOFTWARE WITH DEPENDENCIES

BACKGROUND

With the emergence of bring-your-own-device (BYOD) technology in the workplace, an enterprise can permit its employees to use their own devices to access enterprise data, such as email and corporate documents. However, prior to an employee using his or her own device in the workplace, the enterprise can require the employee to enroll with a device management service capable of protecting enterprise data from theft, data loss, and unauthorized access.

Various operating systems offer services that permit an enterprise to perform a "silent" or unattended installation of software on managed devices where the software is installed as a process that requires no user interaction. As a result, users are not required to navigate and interact with user interfaces to carry out the installation. In some operating systems, silent installations can be performed by generating and executing command line instructions. The features supported by the operating systems in performing silent installations, however, remain limited.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to silently installing software applications and their dependencies on client devices. Various versions of operating systems permit the silent installation of software and other features where no user interaction is required. However, the features supported by these various operating systems in performing silent installations remain limited. For example, some versions of the Microsoft Windows® operating system offer personal computer (PC) services that permit an enterprise to push an installation package file, such as an MSI file, to a device managed by the enterprise. However, the PC and other related services are capable of only performing a silent installation of a single application. If an enterprise wishes to silently install multiple applications, or multiple software components required by those applications, a multitude of installation package files would have to be created and sent to managed devices independently.

According to various examples described herein, a core installation package file is generated by a computing device, such as a server, and pushed to a client device. The core installation package is used by the client device to silently install a secondary installer application or other similar application that carries out the silent installation of various applications and software components. Upon receipt of the core installation package file, the client device can execute a default installer application using the core installation package file to silently install the secondary installer application and copy further installation package files to memory for subsequent installation.

As the functionality of the default installer application is limited, the secondary installer application can be configured to perform functions beyond that of the default installer application. In some examples, the secondary installer application can identify a software dependency required to be installed on the client device for a proper execution of a client application, such as a management agent application or a PC agent application. Further, the secondary installer application can identify a respective installation package file that includes the software dependency and can silently install the software dependency using the installation package file. In further examples, the secondary installer application can communicate with the remote computing device to identify the required dependencies, verify that the client device is in compliance with one or more compliance rules, verify that the client device is enrolled with a device management service, and update an enrollment status associated with the client device. As a result, a single application package file (referred to herein as the core installation package file) can be used to silently install multiple software components without requiring user interaction.

Figure 1:
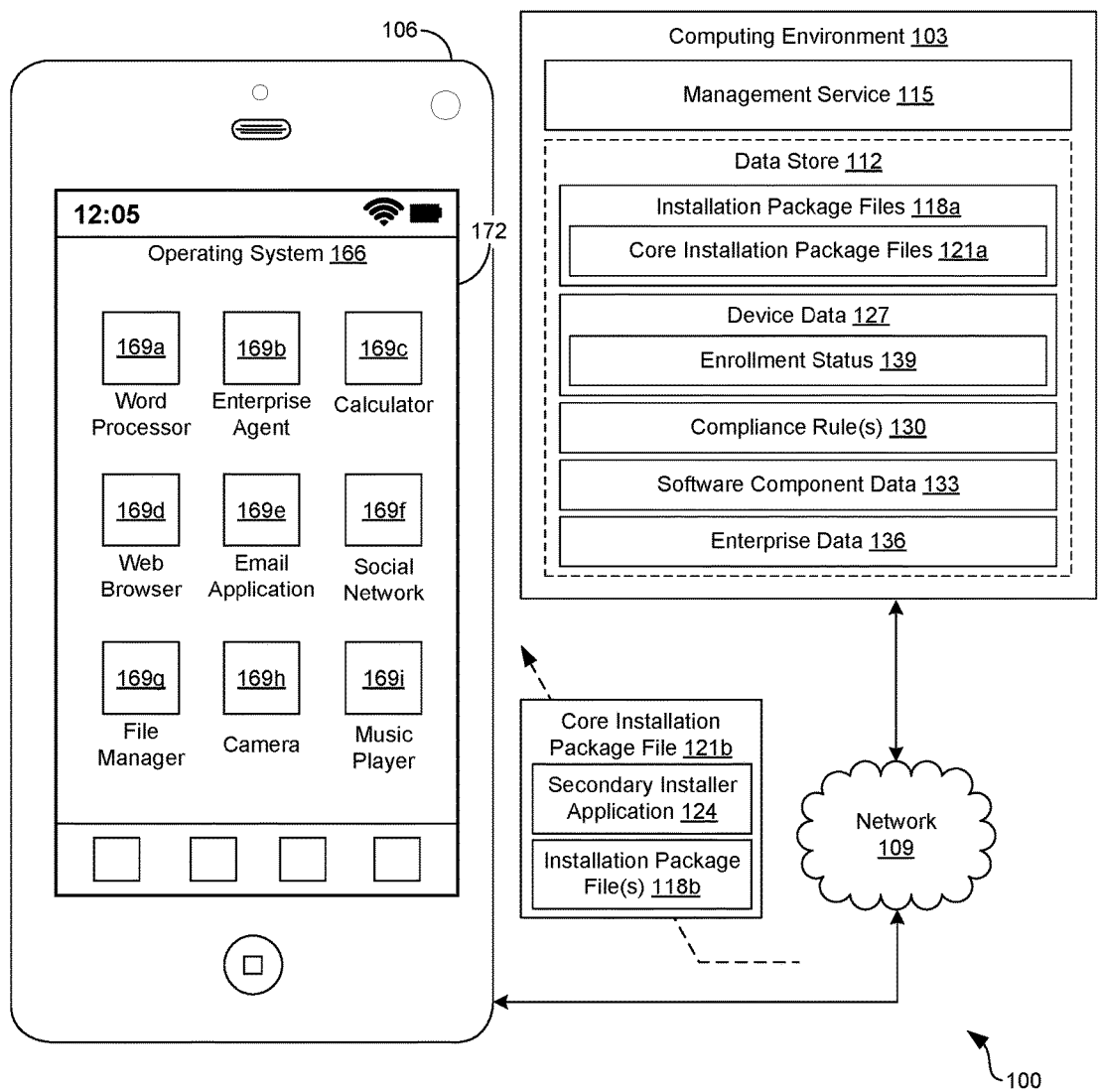
FIG. 1 is a drawing of a networked environment including a device management service.

With reference to FIG. 1, shown is an example of a networked environment 100. The networked environment 100 can include a computing environment 103 and a client device 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 can include, for example, a server computer or any other system providing computing capability. Alternatively, the computing environment 103 can include a plurality of computing devices that are arranged, for example, in one or more server banks, computer banks, or other arrangements. The computing environments 103 can include a grid computing resource and/or any other distributed computing arrangement. The computing devices can be located in a single installation or can be distributed among many different geographical locations. The computing environments 103 can also include or be operated as one or more virtualized computer instances. For purposes of convenience, the computing environment 103 is referred to herein in the singular. Even though the computing environment 103 is referred to in the singular, it is understood that a plurality of computing environments 103 can be employed in the various arrangements as described above.

The data store 112 can include memory of the computing environment 103, mass storage resources of the computing environment 103, or any other storage resources on which data can be stored by the computing environment 103. The data stored in the data store 112, for example, can be associated with the operation of the various applications and/or functional entities described below.

The components executed on the computing environment 103 can include, for example, a management service 115 as well as other applications, services, processes, systems, engines, or functionality not discussed in detail herein. The management service 115 can be executed to oversee the operation of multiple client devices 106. In some embodiments, an enterprise, such as one or more companies or other organizations, can operate the management service 115 to oversee or manage the operation of the client devices 106 of its employees, contractors, customers, or other users having user accounts with the enterprise.

Further, the management service 115 can manage the installation of various software components on the client device 106 using one or more installation package files 118a and 118b (collectively installation package files 118). Such software components can include, for example, applications, libraries, drivers, device configurations, or other similar components that can require installation on the client device 106. In one example, the management service 115 can generate and communicate a specialized type of an installation package file 118, referred to as a core installation package file 121a and 121b (individually core installation package file 121), to send to the client device 106. The core installation package file 121 can cause a default installer application executable on the client device 106 to perform a silent installation of components included within the core installation package file 121, such as other installation package files 118 and a secondary installer application 124 that oversee the installation the installation package files 118 included within the core installation package file 121.

Further, the management service 115 can interact with one or more client applications executed on the client device 106 to enroll the client device 106 with the management service 115. As a result, the management service 115 can verify that configuration and operation of the client device 106 is in conformance with predefined criteria that ensures that enterprise data, or other data, is protected from data loss, unauthorized access, or other harmful event. Additionally, the management service 115 can serve up enterprise data to the client device 106.

The data stored in the data store 112 can include, for example, installation package files 118, device data 127, compliance rules 130, software component data 133, enterprise data 136, as well as other data. In some examples, installation package files 118 include MSI installation package files used by the Microsoft Windows® operating system. However, in other examples, the installation package files 118 can include other formats. The device data 127 can include information associated with one or more client devices 106. In one example, the management service 115 can oversee or manage one or more client devices 106 enrolled with the management service 115. To this end, the management service 115 can maintain an enrollment status 139 for each of the client devices 106 to identify those client devices 106 enrolled with the management service 115.

In one example, a client device 106 designated as "enrolled" can be permitted to access the enterprise data 136 while a client device 106 designated as "not enrolled" or having no designation can be denied access to the enterprise data 136. Additionally, the management service 115 can require certain software components to be installed on the client device 106 before the client device 106 can access various information, such as the enterprise data 136.

The data store 112 can include additional constraints that must be satisfied for enterprise data 136 to become accessible to a client device 106. For example, the compliance rules 130 can include predefined constraints that must be met in order for the management service 115, or other application, to permit access to the enterprise data 136. In some examples, the management service 115 communicates with one or more client applications executable on the client device 106 to determine whether vulnerabilities exist on the client device 106 that do not satisfy the compliance rules 130. Vulnerabilities can include, for example, the presence of a virus or malware on the client device 106, the client device 106 being "rooted" or "jailbroken" where root access is provided to a user of the client device 106, the presence of particular applications or files, questionable device configurations, or other vulnerability as can be appreciated.

Software component data 133 can include applications, libraries, drivers, scripts, files, or similar components that require installation on one or more client devices 106. As can be appreciated, the software component data 133 can include different versions of applications, libraries, drivers, scripts, file types, or other components capable of installation on different operating systems, types of client devices 106, or other variables. The enterprise data 136 can include, for example, documents, emails, and other data maintained by an enterprise.

The client device 106 can be representative of one or more client devices 106. The client device 106 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 106 can include a display 172 that can be a liquid crystal display (LCD), touch-screen display, or other types of display devices. The client device 106 can also be equipped with networking capability or networking interfaces, including a localized networking or communication capability, such as a near-field communication (NFC) capability, radio-frequency identification (RFID) read or write capability, or other localized communication capability.

The client device 106 can include an operating system 166 configured to execute various client applications 169a . . . 169i (collectively client applications 169). Some client applications 169 can access network content served up by the computing environment 103 or other servers, thereby rendering a user interface on a display 172. To this end, some client applications 169 can include a browser or a dedicated application, and a user interface can include a network page, an application screen, or other interface. Further, other client applications 169 can include device management applications, enterprise applications, social networking applications, word processors, spreadsheet applications, media viewing application, or other applications.

Next, a general description of the operation of the various components of the networked environment 100 is provided. As noted above, some operating systems 166 permit silent installation of a single application using a single installation package file 118. Accordingly, installing multiple applications, or software components required by those applications, using a single installation package file 118 require user interaction or are not permitted using the standard features of the management service 115. According to the examples provided herein, a single installation package file 118, referred to as the core installation package file 121, can silently install multiple applications or software components.

To begin, the management service 115 can generate a core installation package file 121 that facilitates the silent installation of various software items on the client device 106. Silently installing software items can include performing an installation of a software component as a background process where no user interfaces are presented on the client device 106. As a result, a user of the client device 106 is not required to navigate one or more user interfaces to install a client application 169 or its dependencies. In some examples, a user of a client device 106 may be unaware that a silent installation is being performed on the client device 106.

In one example, a core installation package file 121 can be generated to facilitate the silent installation of a secondary installer application 124 configured to carry out multiple silent installations on the client device 106. The secondary installer application 124 can include, for example, an application dedicated to silently installing software components on the client device 106. Alternatively, the secondary installer application 124 can include an application that performs functions beyond silently installing software components. For example, the secondary installer application 124 can include a management agent application that interacts with the management service 115 to oversee the operation of the client device 106 and protect access to enterprise data 136. The management agent application can also be configured to silently install software components required for the management agent application to properly execute and/or perform various functions.

Upon receipt of the core installation package file 121, the client device 106 can execute a default installer application 206 using the core installation package file 121 to silently install the secondary installer application 124. Further, the default installer application 206 can store one or more installation package files 118 in memory of the client device 106 that can be used by the secondary installer application 124 to install other software components, such as other applications, libraries, drivers, scripts, files, or similar components. In one example, the secondary installer application 124 can be associated with a staging directory where one or more installation package files 118 are stored during the silent installation of the secondary installer application 124. Upon completion of the silent installation, the secondary installer application 124 can be automatically executed where installation package files 118 in the staging directory are identified and used to perform subsequent silent installations, if necessary.

The secondary installer application 124 can run diagnostics on the client device 106 to generate diagnostic data that can include, for example, a version of an operating system 166 running on the client device 106, software components installed (or not installed) on the client device 106, versions of the software components installed on the client device 106, hardware and software capabilities, hardware and software configurations, and similar information. The diagnostic data can be used to generate device state information 212 describing a state of the client device 106.

Using the diagnostic data, the secondary installer application 124 can identify a software dependency required to be installed on the client device 106 for an intended execution of a client application 169, such as a management agent application. Knowing a software dependency required to be installed on the client device 106, the secondary installer application 124 can identify a respective installation package file 118 in the staging directory that includes the software dependency. As can be appreciated, installation of the respective installation package file 118 causes the required software dependency to become accessible from application executable on the client device 106.

In some examples, the secondary installer application 124 can oversee the installation of the software dependency using the installation package file 118 by making a programmatic call to the default installer application 206 to silently install the software dependency using the installation package file identified in the staging directory. The call can include a command line call in various examples. In an example where the default installer application 206 includes the default Microsoft Windows® installer application, msiexec.exe, the command line call can include:

msiexec /s CoreInstallationPackageFile.msi where the flag "/s" causes msiexec.exe to perform a silent installation using the core installation package file 121 ("CoreInstallationPackageFile.msi"). As can be appreciated, the command line can include a command line argument of a directory path to the core installation package file 121.

In some examples, the secondary installer application 124 can communicate with the computing environment 103 to identify the required dependencies or software components that require installation on the client device 106. For example, the secondary installer application 124 can communicate information obtained from the diagnostics to the management service 115 which can then determine which software components require installation on the client device 106. To this end, the management service 115 can verify that certain software components are installed on the client device 106 prior to permitting access to enterprise data.

In other examples, the secondary installer application 124 can communicate with the management service 115 to verify that the client device 106 is in compliance with one or more compliance rules 130. This can include communicating the device state information 212 to the computing environment 103 for remote analysis. If the secondary installer application 124 detects a vulnerability on the client device 106 not in conformance with a compliance rule 130, the secondary installer application 124 can abstain from performing an installation of the client application 169 or other software components until the vulnerability has been addressed or alleviated. Such vulnerability can include, for example, the presence of a virus or malware on the client device 106, the client device 106 being "rooted" or "jailbroken" where root access is provided to a user of the client device 106, the presence of particular applications or files, or other vulnerability as can be appreciated.

Further, in some examples, the secondary installer application 124 can communicate with the management service 115 to verify that the client device 106 is enrolled with the management service 115. In some examples, the secondary installer application 124 can verify that the client device 106 is enrolled with the management service 115 prior to installation the client application 169 or other software component. In other examples, upon the successful installation of a client application 169 or other software component on the client device 106, the management service 115 can update the enrollment status 139 of the client device 106 to "enrolled" such that certain functionality can be permitted on the client device 106, such as accessing enterprise data 136.

Figure 2:
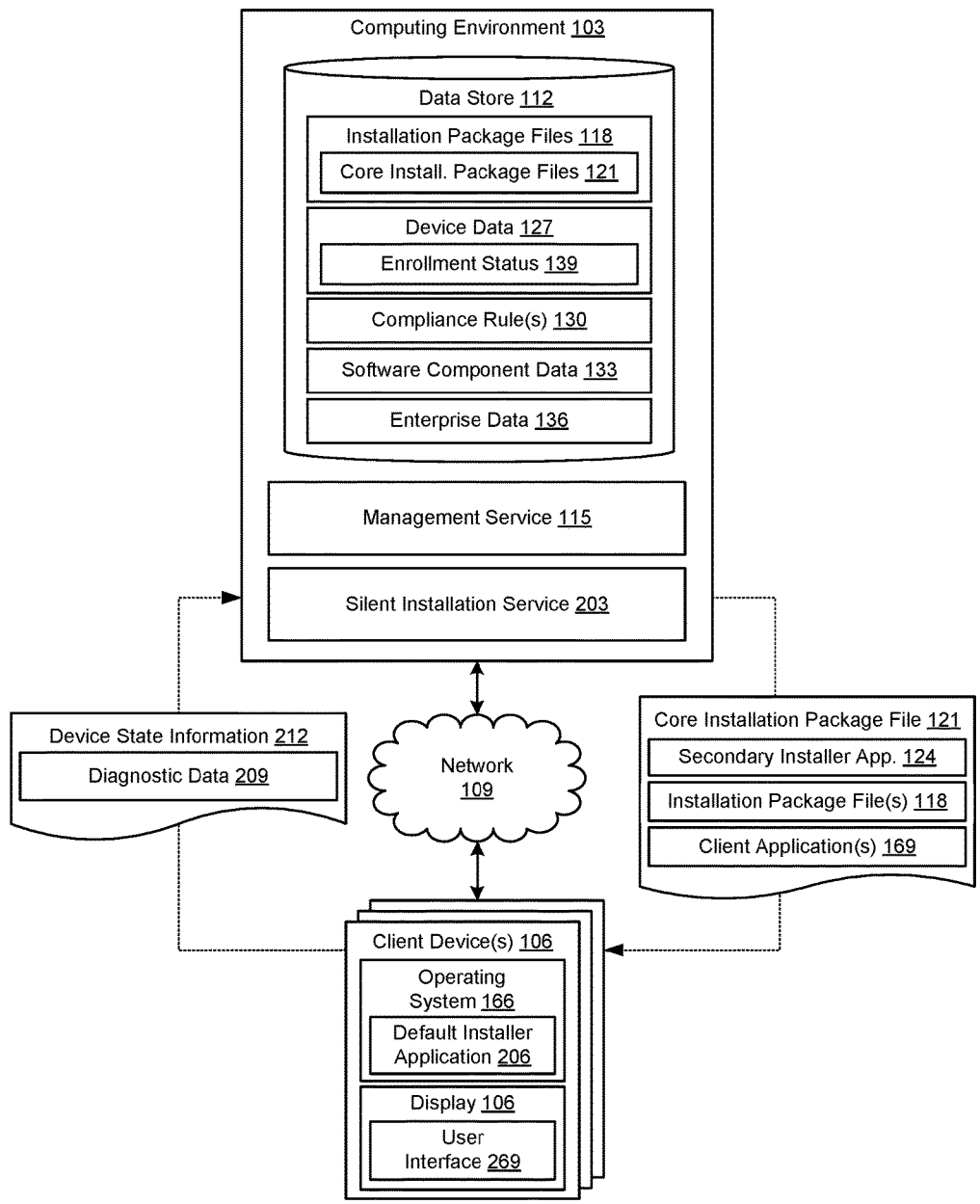
FIG. 2 is another drawing of the networked environment including the device management service and a silent installation service.

Moving on to FIG. 2, shown is another example of the networked environment 100. The computing environment 103 can also include a silent installation service 203 independent from the management service 115. In one example, the management service 115 executes in a first computing environment 103 operated by a first entity while the silent installation service 203 executes in a second computing environment 103 operated by a second entity. In some examples, the silent installation service 203 includes Microsoft Intune® service that facilitates silent installation of software on a client device 106. To this end, the management service 115 can provide a core installation package file 121 to the silent installation service 203 which then facilitates the silent installation of the secondary installer application 124 and other desired software components. Other device management services 115 beyond Microsoft Intune® service can be employed.

In one example, the core installation package file 121 can be generated by the silent installation service 203 to facilitate the silent installation of the secondary installer application 124 which carries out multiple silent installations on the client device 106. As a result, only a single installation package file 118, the core installation package file 121, is required to be communicated to the client device 106. The silent installation service 203 can make the core installation package file 121 available to the management service 115 which oversees the silent installation on the client device 106. For example, upon receipt of the core installation package file 121, the client device 106 can execute a default installer application 206 using the core installation package file 121 to silently install the secondary installer application 124.

During installation of the secondary installer application 124, the default installer application 206 can store one or more installation package files 118 included in the core installation package file 121 in memory of the client device 106. The installation package files 118 stored in memory can be used by the secondary installer application 124 to install other applications, libraries, drivers, scripts, or other software components. In one example, the secondary installer application 124 is associated with a staging directory where one or more installation package files 118 are stored by the default installer application 206. Upon completion of the silent installation, the secondary installer application 124 is automatically executed where the secondary installer application 124 identifies installation package files 118 in the directory and uses the installation package files 118 to perform subsequent silent installations.

In some examples, the secondary installer application 124 can oversee the installation of a client application 169 executable on the client device 106. For example, the secondary installer application 124 can install the management agent application that interacts with the management service 115 to oversee the operation of the client device 106 and serve up enterprise data 136. In addition to the client application 169, the secondary installer application 124 can identify software dependencies required by the client application 169. For example, certain software or hardware functions can be performed by the client application 169 if a suitable library or driver is installed on the client device 106. The secondary installer application 124 can identify a software dependency required by the client application 169, locate an installation package file 118 from memory that includes the software dependency, and oversee the silent installation of the software dependency using its installation package file 118.

In one example, software dependencies for a client application 169 can include, C libraries, C++ libraries, Open Graphic Library (OpenGL) libraries, Microsoft® ActiveX libraries, Visual Basic (VB) libraries, or other software components that require installation for the client application 169 to perform in accordance with its intended functionality when executing on the client device 106. In scenarios where the client application 169 includes a video game, the software dependencies may be graphics libraries, such as OpenGL or Microsoft® DirectX libraries, which are invoked by the source code or object code of the client application 169.

In some examples, the secondary installer application 124 can communicate with the computing environment 103 to identify the required dependencies or software components that require installation on the client device 106. For example, the secondary installer application 124 can communicate information obtained from diagnostics taken on the client device 106 to the management service 115 as the device state information 212. In other examples, the management service 115 can identify dependencies specified in a manifest file for the client application 169. The management service 115 can then determine which software components require installation on the client device 106. As a result, the management service 115 can verify that certain software components are installed on the client device 106 prior to permitting access to enterprise data 136.

In other examples, the secondary installer application 124 can communicate with the management service 115 to verify that the client device 106 is in compliance with one or more compliance rules 130. For example, if the secondary installer application 124 detects a setting, a file, a performed event, or other instance on the client device 106 that is not in conformance with a compliance rule 130, the secondary installer application 124 can abstain from performing an installation of the client application 169 or other software components until the vulnerability has been addressed or alleviated. Such vulnerability can include, for example, the presence of a virus or malware on the client device 106, the client device 106 being "rooted" or "jailbroken" where root access is provided to a user of the client device 106, or other vulnerability as can be appreciated.

Further, in some examples, the secondary installer application 124 can communicate with the management service 115 to verify that the client device 106 is enrolled with the management service 115. In some examples, the secondary installer application 124 can determine whether the client device 106 is enrolled with the management service 115 prior to installation the client application 169 or other software component. In other examples, upon the successful installation of a client application 169 or other software component on the client device 106, the management service 115 can update the enrollment status 139 of the client device 106 to "enrolled" such that certain functionality can be permitted on the client device 106, such as accessing enterprise data 136. In further examples, the computing environment 103 can verify that all features of the client application 169 are operating as intended prior to updating the enrollment status 139 for a client device 106.

The secondary installer application 124 can run diagnostics on the client device 106 to generate diagnostic data 209 that can include, for example, a version of an operating system 166 running on the client device 106, software components installed (or not installed) on the client device 106, versions of the software components installed on the client device 106, hardware and software capabilities, hardware and software configurations, and similar actions. The diagnostic data 209 can be used to generate the device state information 212.

Using the diagnostic data 209, the secondary installer application 124 can identify a software dependency required to be installed on the client device 106 for an intended execution of a client application 169, such as the management agent application. Knowing a software dependency required to be installed on the client device 106, the secondary installer application 124 can identify a respective installation package file 118 in the staging directory that includes the software dependency. As can be appreciated, installation of the respective installation package file 118 causes the required software dependency to become accessible from application executable on the client device 106.

In some examples, the secondary installer application 124 can communicate with the computing environment 103 to identify the required dependencies or software components that require installation on the client device 106. For example, the secondary installer application 124 can communicate information obtained from the diagnostics to the management service 115, which can then determine which software components require installation on the client device 106. To this end, the management service 115 can verify that certain software components are installed on the client device 106 prior to permitting the client device 106 access to enterprise data.

Figure 3:
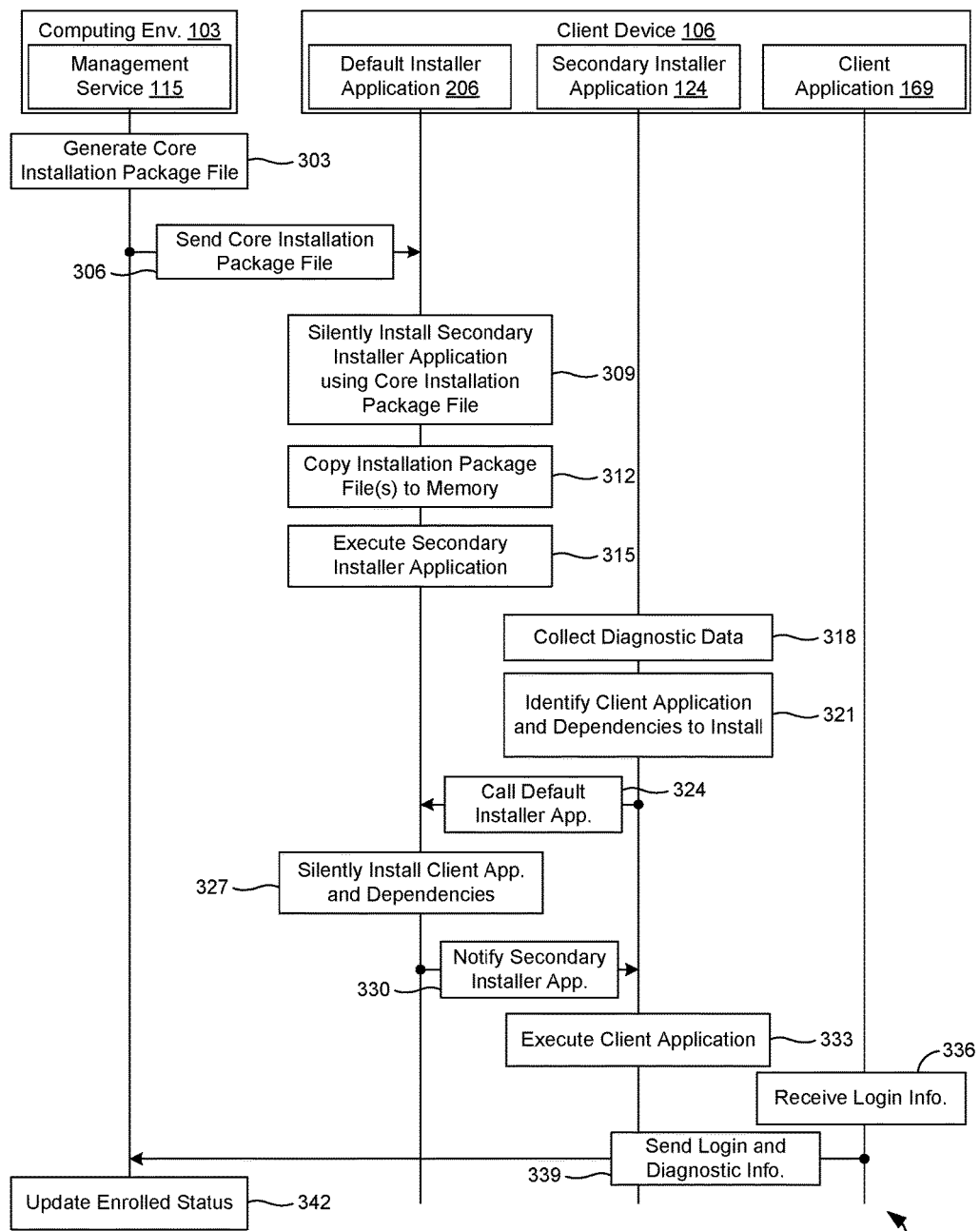
FIG. 3 shows a sequence diagram illustrating an example of component interaction in the networked environment.

With reference to FIG. 3, shown is a sequence diagram 300 illustrating an example of interactions of components in the networked environment 100. The sequence diagram of FIG. 3 illustrates an example of the management service 115 causing a silent installation of multiple software components on a client device 106 using a single installation package file 118, referred to as the core installation package file 121. The software components can include, for example, applications, libraries, drivers, scripts, files, or other components. Although the computing environment 103 shown in FIG. 3 includes the management service 115, it is understood that in some examples the described functionality can be implemented by another service, such as the silent installation service 203.

Beginning with step 303, the management service 115 can generate a core installation package file 121 that facilitates the silent installation of multiple software components on the client device 106. In one example, the core installation package file 121 can be generated to silently install the secondary installer application 124 which, in turn, can oversee silent installation of multiple components on the client device 106. In step 306, the management service 115 sends the core installation package file 121 to the client device 106.

Upon receipt of the core installation package file 121, in step 309, the client device 106 can silently install the secondary installer application 124 using the default installer application 206. In an example where the default installer application 206 includes the default Microsoft Windows® installer application, a command line call is performed to msiexec.exe with a suitable flag or command line argument that causes a silent installation using the core installation package file 121.

In step 312, the default installer application 206 can copy one or more installation package files 118, such as MSI files, included in the core installation package file 121 to memory of the client device 106. In one example, the one or more installation package files 118 can be copied to a predefined staging directory. As can be appreciated, the installation package files 118 copied to memory of the client device 106 can include MSI files or other files for the installation of required software dependencies. Software dependencies can include, for example, C libraries, C++ libraries, Open Graphic Library (OpenGL) libraries, Microsoft® ActiveX libraries, Visual Basic (VB) libraries, or other software component requiring installation for an application to perform in accordance with its intended functionality. In one example, an MSI file for the C++ library, an MSI file for the OpenGL library, and other MSI files can be included in the core installation package file 121. During installation using the core installation package file 121, the MSI file for the C++ library and the MSI file for the OpenGL library are copied into a staging directory for access by the secondary installer application 124 in the event the C++ library or the OpenGL library require installation.

In step 315, the secondary installer application 124 is executed after installation. Moving on to step 318, the secondary installer application 124 can collect diagnostic data 209, for example, to generate the device state information 212. The device state information 212 can include, for example, a version of an operating system 166 running on the client device 106, software components installed (or not installed) on the client device 106, versions of the software components installed on the client device 106, hardware or software configurations, user-defined settings, and other similar information. Using the device state information 212 or the diagnostic data 209, the secondary installer application 124 can ultimately identify which software components require installation on the client device 106. In some examples, the device state information 212 and the diagnostic data 209 can be sent to the computing environment 103 to remotely identify which software components require installation on the client device 106. The software components that require installation on the client device 106 for a proper or intended execution of a client application 169 can be referred to as dependencies or software dependencies.

In step 321, the secondary installer application 124 can identify one or more components to be installed on the client device 106. For example, the secondary installer application 124 can determine to install the client application 169 as well as any dependencies required for the client application 169 to execute or function as programmed or otherwise intended. The secondary installer application 124 can use the device state information 212 to identify the dependencies required to be installed on the client device 106 for the client application 169 to function as intended. Knowing a software component required to be installed on the client device 106, the secondary installer application 124 can identify a respective installation package file 118 in the staging directory that includes the software component.

In step 324, the secondary installer application 124 can call the default installer application 206 to silently install one of the installation package files 118 copied to the memory of the client device 106. This can include generating a command line call to the default installer application 206. For example, assuming a client application 169 requires the C# library to be installed on the client device 106 for the client application 169 to execute as intended, the secondary installer application 124 can identify one of the installation package files 118 that include the C# library. The secondary installer application 124 can call the default installer application 206 to use the identified installation package file 118 to silently install the C# library.

In some examples, the secondary installer application 124 can bypass diagnostics and merely install every software component included in the installation package files 118 copied to the client device 106. To this end, the computing environment 103 can generate a core installation package file 121 that includes only installation package files 118 that require installation on the client device 106. The secondary installer application 124 can identify all installation package files 118 copied to the staging directory and can call the default installer application 206 silently install each installation package file 118 one by one.

Moving on to step 327, the default installer application 206 installs software components, such as applications, libraries, drivers, or other software components, as directed by the secondary installer application 124. Upon completion, in step 330, the secondary installer application 124 notifies the secondary installer application 124 which, in turn, can generate a subsequent command line call to silently install the next software component as needed until all required software components have been silently installed. After installation of all required software components, in step 333, the client application 169 is executed by the secondary installer application 124. This can be performed by generating and invoking a command line argument that executes the client application 169 on the client device 106.

In some examples, the client application 169 can include a PC management application configured to enroll the client device 106 with the management service 115 or other similar service. In step 336, the client application 169 can receive login information from a user of the client device 106. The login information can include, for example, a username, a password, an email address, a personal identification number (PIN), biometric data, or other information. In step 339, the client application 169 can send the login information or the diagnostic information to the computing environment 103 to authenticate the client device 106 as well as determine if the client device 106 has been enrolled with the management service 115. If the client device 106 has not been enrolled, the management service 115 can use the device state information 212, the diagnostic data 209, or the login information to enroll the client device 106. In some examples, the management service 115 can determine whether the required dependencies were installed on the client device 106 prior to enrolling the client device 106. In other examples, the management service 115 can determine whether a state of the client device 106 complies with one or more compliance rules 130 using, for example, the device state information 212. In step 342, the computing environment 103 can update the enrollment status 139 in the data store 112.

Figure 4:
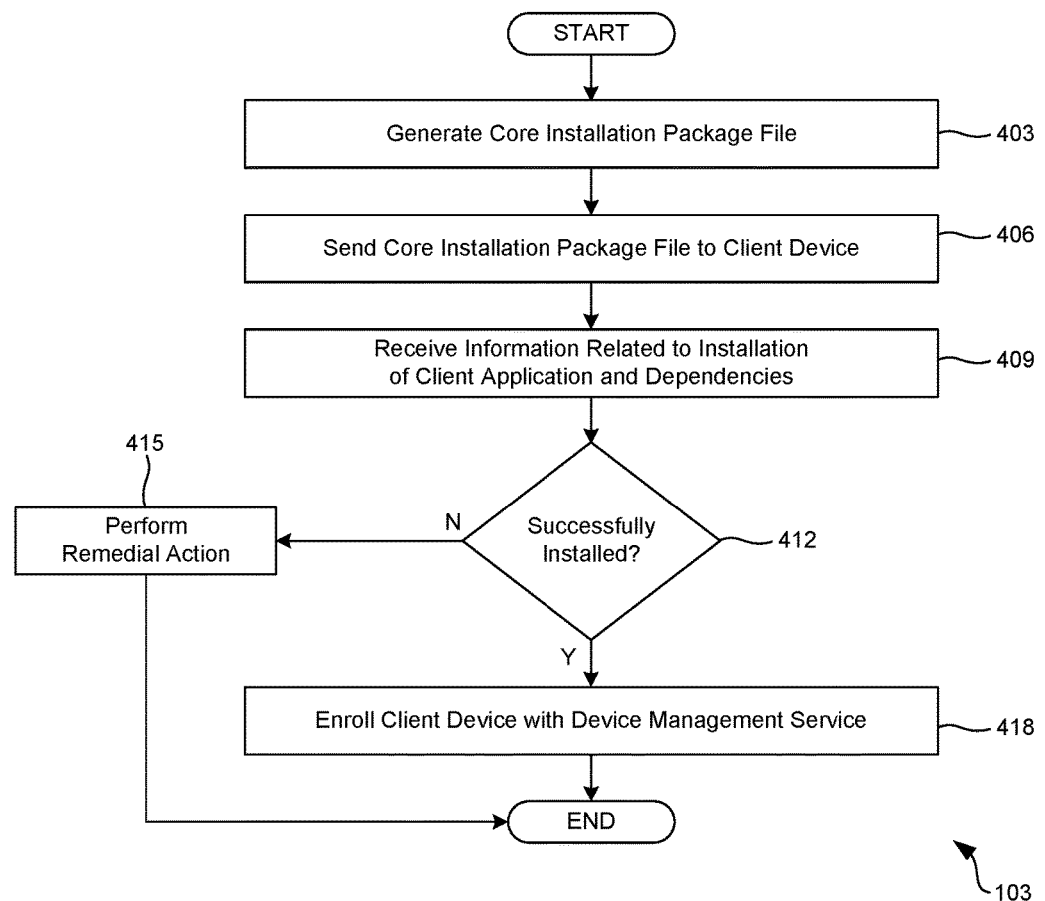
FIG. 4 is a flowchart illustrating functionality implemented by components of the networked environment.

Referring next to FIG. 4, shown is a flowchart that provides one example of the operation of a portion of the computing environment 103. As an alternative, the flowchart of FIG. 4 can be viewed as depicting an example of elements of a method implemented by the management service 115 or the silent installation service 203 according to one or more embodiments. The separation or segmentation of functionality as discussed herein is presented for illustrative purposes only.

According to the examples provided herein, a core installation package file 121 can be used by an installer application to silently install one or more applications as well as their required software dependencies. Beginning with step 403, the computing environment 103 can generate the core installation package file 121 to facilitate the silent installation of multiple software components on the client device 106. For example, the core installation package file 121 can be generated to silently install the secondary installer application 124 which, in turn, can oversee silent installation of a client application 169 on the client device 106 as well as libraries, drivers, or other components that the client application 169 may require for the client application 169 to operate as intended.

In step 406, the core installation package file 121 is sent to the client device 106 over a network 109. In some examples, the core installation package file 121 is generated by a first service, such as the silent installation service 203, and communicated to a second service, such as the management service 115, that facilitates the silent installation of the core installation package file 121 on the client device 106. In step 406, the management service 115 sends the core installation package file 121 to the client device 106.

As can be appreciated, the client device 106 receives the core installation package file 121 which prompts the client device 106 to install the secondary installer application 124 and copy installation package files 118 included therein to the memory of the client device 106. The secondary installer application 124 proceeds to install the client application 169 and its required dependencies using the copied installation package files 118.

In step 409, the computing environment 103 can receive information related to the installation of the client application 169 and its required dependencies. The information can include log data generated by the default installer application 206 or the secondary installer application 124 during the silent installation of the installation package files 118. Further, the information can include diagnostic data collected by the client application 169 or the secondary installer application 124. Collecting diagnostic data can include, for example, verifying a version of the client application 169 installed on the device, verifying the presence of the required software components in memory, and other information.

In step 412, the computing environment 103 can use the information related to the installation of the client application 169 and its dependencies to determine whether the client application 169 and its required dependencies have been installed. If the client application 169 or its required dependencies have not been installed, the process can proceed to step 415 to perform a remedial action. A remedial action can include, for example, attempting a re-installation of the client application 169 or its required dependencies on the client device 106.

If the client application 169 or its required dependencies have been installed, the process can proceed to step 418 to enroll the client device 106 with the management service 115. In some examples, the management service 115 can now provide management functions in association with the client device 106, such as providing enterprise data 136 to the client device 106 and verifying that the client device 106 is in compliance with one or more compliance rules 130.

Figure 5:
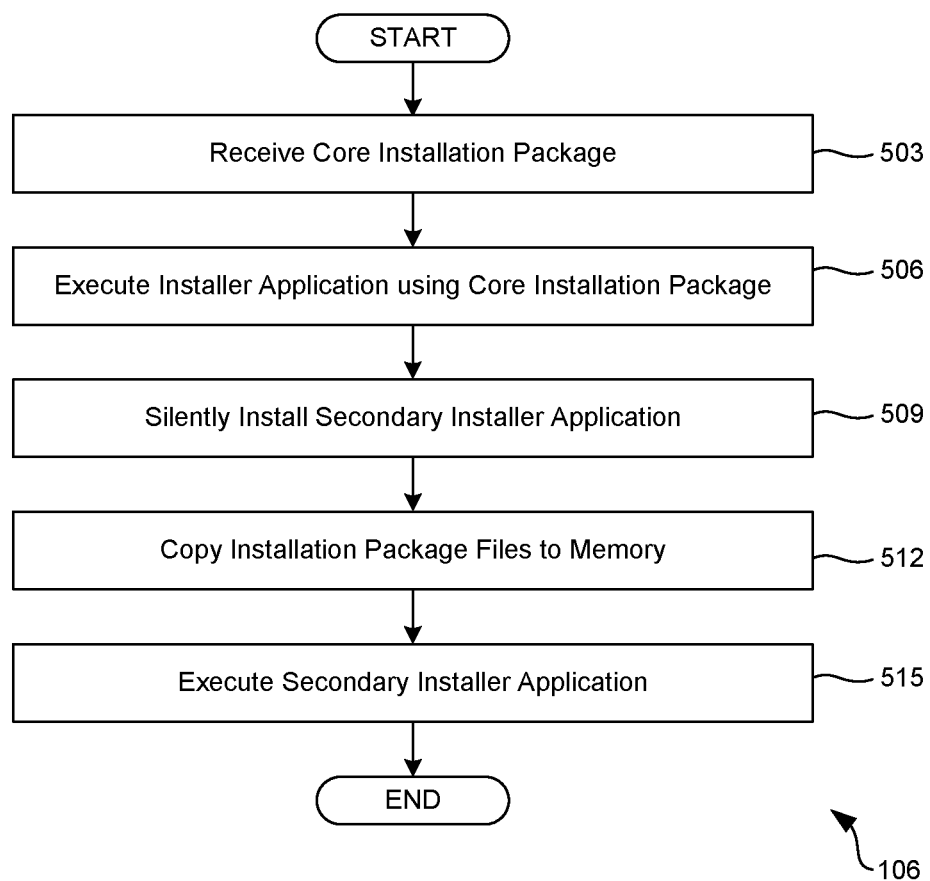
FIG. 5 is a flowchart illustrating functionality implemented by components of the networked environment.

Moving on to FIG. 5, shown is a flowchart that provides one example of the operation of a portion of the client device 106. The flowchart of FIG. 5 can be viewed as depicting an example of elements of a method implemented by an operating system of the client device 106, an application executable on the client device 106, or hardware of the client device 106 according to one or more examples. The separation or segmentation of functionality as discussed herein is presented for illustrative purposes only.

Starting at step 503, the client device 106 can receive a core installation package file 121 from the computing environment 103. In step 506, a default installer application 206 preloaded on the client device 106 can be executed using the core installation package file 121. In an example where the default installer application 206 includes the default Microsoft Windows® installer application, msiexec.exe, a command line call can be generated to include:

msiexec /s CoreInstallationPackageFile.msi where the flag "/s" causes msiexec.exe to perform a silent installation using the core installation package file 121 labeled "CoreInstallationPackageFile.msi." Thereafter, in step 509, the default installer application 206 can silently install software components as directed by the core installation package file 121. In one example, the software components include a secondary installer application 124 that oversees the silent installation of multiple software components bundled within the core installation package file 121. For example, the secondary installer application 124 can oversee the silent installation of a client application 169 and its required dependencies. To do so, in step 512, the default installer application 206 can copy one or more installation package files 118 bundled within the core installation package file 121 to memory of the client device 106. In some examples, the installation package files 118 are stored into a predefined staging directory. In step 515, the secondary installer application 124 is executed after its installation on the client device 106. Accordingly, the secondary installer application 124 can locate the installation package files 118 stored in the predefined staging directory and can use the installation package files 118 to perform silent installations as needed.

Figure 6:
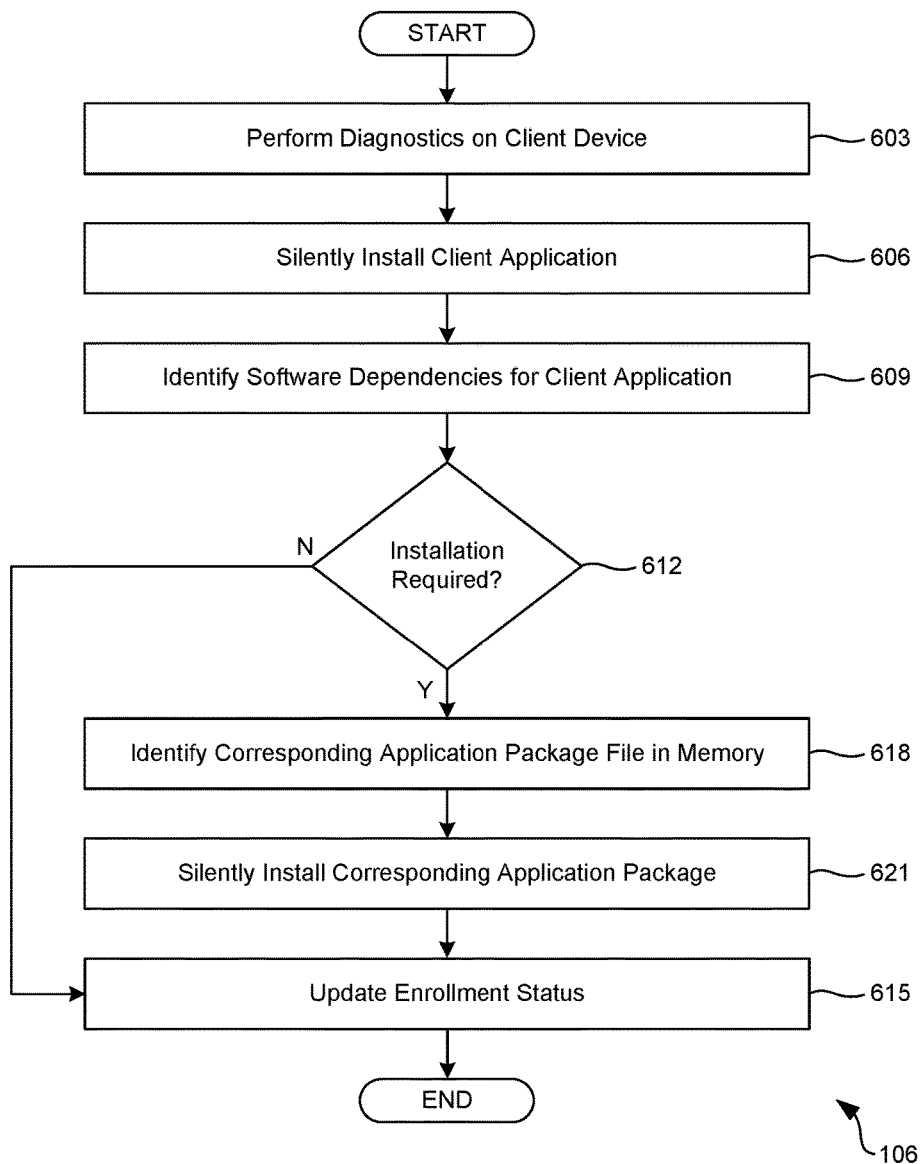
FIG. 6 is a flowchart illustrating functionality implemented by components of the networked environment.

Referring next to FIG. 6, shown is a flowchart that provides one example of the operation of a portion of the client device 106. The flowchart of FIG. 6 can be viewed as depicting an example of elements of a method implemented by the secondary installer application 124 or other application. The separation or segmentation of functionality as discussed herein is presented for illustrative purposes only. In some examples, the flowchart of FIG. 6 can be performed after installation of the secondary installer application 124 on the client device 106.

In step 603, the client device 106 can perform diagnostics to identify, for example, which dependencies require installation on the client device 106. In some examples, the diagnostics include a version of an operating system 166 running on the client device 106, software components installed (or not installed) on the client device 106, versions of the software components installed on the client device 106, and other similar actions. In step 606, client application 169 can be silently installed on the client device 106. In some examples, the secondary installer application 124 can identify an installation package file 118 stored in the staging directory that corresponds to the client application 169. Using the installation package file 118, the secondary installer application 124 can make a programmatic call to the default installer application 206 or other installer application to silently install the client application 169.

Silently installing the client application 169 can include performing an installation of a software component, such as the client application 169, as a background process where no user interfaces 269 or other user-focused interactions are presented on the client device 106. As a result, a user of the client device 106 is not required to navigate one or more user interfaces 269 to install a client application 169 or its dependencies. In some examples, a user of a client device 106 may be unaware that a silent installation is being performed on the client device 106.

In step 609, the secondary installer application 124 can use the diagnostics obtained in step 603 to identify software components that require installation on the client device 106. In some examples, the diagnostics can be sent to the computing environment 103 to remotely identify which software components require installation on the client device 106. The software components can include, for example, applications, libraries, drivers, or similar components. In step 612, the client device 106 determines whether installation of a software dependency is required. If installation of a software dependency is not required, the process can proceed to step 615 to update the enrollment status of the client device 106 with the management service 115.

Alternatively, if installation of a software dependency is required, the process can proceed to step 618 to identify an installation package file 118 stored in memory of the client device 106 that corresponds to the required software dependency. For example, if a client application 169 is a video game, it could require the OpenGL to be installed on the client device 106 prior to playing the video game. Hence, an installation package file 118 for OpenGL can be located for silent installation. In some examples, an installation package file 118 can be downloaded from the computing environment 103 if it has not been previously loaded into memory of the client device 106.

In step 621, the client device 106 can oversee the silent installation of the installation package file 118 for the required software dependency. For example, the secondary installer application 124 can call the default installer application 206 to silently install one of the installation package files 118 copied to the memory of the client device 106.

In further examples, the secondary installer application 124 can bypass diagnostics and can merely install every installation package file 118 copied to the client device 106. To this end, the computing environment 103 can generate a core installation package file 121 that includes only installation package files 118 requiring installation on the client device 106. The secondary installer application 124 can identify all installation package files 118 copied to the staging directory and can call the default installer application 206 silently install each installation package file 118 one-by-one.

The client devices 106 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 169, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 106 can include a display 172 upon which a user interface 269 generated by the client application 169 or another application can be rendered. In some examples, the user interface 269 can be generated using user interface data provided by the computing environment 103. The client device 106 can also include one or more input/output devices that can include, for example, a capacitive touchscreen or other type of touch input device, fingerprint reader, or keyboard.

Although the management service 115, the client application 169, and other various systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

Therefore, the following is claimed:

1. A non-transitory computer-readable medium embodying at least one program executable in at least one computing device, the at least one program comprising program instructions that, when executed, cause the at least one computing device to:
   identify an operating system of a client device that permits silent installation of only a single package file when requested by a remote management service;
   in an instance in which the operating system permits installation of only the single package file, generate, by the remote management service, a core installation package file comprising a secondary installer application and a plurality of installation package files, wherein, when executed, the secondary installer application causes the client device to:
      direct a default installer application of the operating system to silently install a client application using a first one of the installation package files, wherein the core installation package file comprises the client application;
      identify that a software dependency is required to be installed on the client device for execution of the client application;
      identify a second one of the installation packages files that corresponds to the software dependency; and
      direct the default installer application of the client device to silently install the software dependency using the second one of the installation package files;
   send, by the remote management service, the core installation package file to the client device; and
   cause the core installation package file to be installed by:
      causing a silent installation of the secondary installer application on the client device; and
      causing the installation package files to be copied to memory of the client device.

2. The non-transitory computer-readable medium of claim 1, wherein silently installing the software dependency using the second one of the installation package files further comprises generating a command line call to the default installer application of the client device, the command line call comprising at least one command line argument that includes a path to the second one of the installation package files.

3. The non-transitory computer-readable medium of claim 1, wherein the software dependency comprises a software library, a driver, a script, a file, or a different client application.

4. The non-transitory computer-readable medium of claim 1, wherein identifying that the software dependency is required to be installed on the client device for execution of the client application further comprises:
 identifying device state information describing a state of the client device at the at least one computing device; and
 determining that the software dependency is required to be installed on the client device using the device state information.

5. The non-transitory computer-readable medium of claim 4, wherein the device state information comprises a version of an operating system on the client device, a software component installed on the client device, a hardware capability of the client device, a software capability of the client device, a hardware configuration of the client device, or a software configuration of the client device.

6. The non-transitory computer-readable medium of claim 1, wherein the at least one program further comprises program instructions that, when executed, cause the at least one computing device to verify that the client application and the software dependency were installed on the client device.

7. The non-transitory computer-readable medium of claim 1, wherein the at least one program further comprises program instructions that, when executed, cause the at least one computing device to:
 after the default installer application of the operating system silently installs the client application, enroll the client device with the remote management service using the client application; and
 update an enrollment status for the client device stored in a data store accessible by the at least one computing device.

8. A computer-implemented method for performing multiple silent installations on a client device, comprising:
 identifying an operating system of the client device that permits silent installation of only a single package file when requested by a remote management service;
 in an instance in which the operating system permits installation of only the single package file, generating, by the remote management service, a core installation package file comprising a secondary installer application and a plurality of installation package files, wherein, when executed, the secondary installer application causes a client device to:
  direct a default installer application of the operating system to silently install a client application using a first one of the installation package files, wherein the core installation package file comprises the client application;
  identify that a software dependency is required to be installed on the client device for execution of the client application;
  identify a second one of the installation packages files that corresponds to the software dependency; and
  direct the default installer application of the client device to silently install the software dependency using the second one of the installation package files;
 sending, by the remote management service, the core installation package file to the client device; and
 causing the core installation package file to be installed by:
  causing a silent installation of the secondary installer application on the client device; and
  causing the installation package files to be copied to memory of the client device.

9. The computer-implemented method of claim 8, wherein silently installing the software dependency using the second one of the installation package files further comprises generating a command line call to the default installer application, the command line call comprising at least one command line argument that includes a path to the second one of the installation package files.

10. The computer-implemented method of claim 8, wherein the software dependency comprises a software library, a driver, a script, a file, or a different client application.

11. The computer-implemented method of claim 8, wherein identifying that the software dependency is required to be installed on the client device for execution of the client application further comprises:
 identifying device state information describing a state of the client device at the at least one computing device; and
 determining that the software dependency is required to be installed on the client device using the device state information.

12. The computer-implemented method of claim 11, wherein the device state information comprises a version of an operating system on the client device, a software component installed on the client device, a hardware capability of the client device, a software capability of the client device, a hardware configuration of the client device, or a software configuration of the client device.

13. The computer-implemented method of claim 8, further comprising verifying that the client application and the software dependency were installed on the client device.

14. The computer-implemented method of claim 8, further comprising:
 after the default installer application of the operating system silently installs the client application, enrolling the client device with the remote management service using the client application; and
 updating an enrollment status for the client device stored in a data store accessible by the at least one computing device.

15. A system, comprising:
 at least one computing device comprising at least one hardware processor, the at least one computing device in data communication with a client device over a network;
 program code that, when executed by the at least one computing device, causes the at least one computing device to:
  identify an operating system of the client device that permits silent installation of only a single package file when requested by a remote management service;
  in an instance in which the operating system permits installation of only the single package file, generate, by the management service, a core installation package file comprising a secondary installer application and a plurality of installation package files, wherein, when executed, the secondary installer application causes the client device to:

direct a default installer application of the operating system to silently install a client application on the client device using a first one of the installation package files, wherein the core installation package file comprises the client application;

identify that a software dependency is required to be installed on the client device for execution of the client application;

identify a second one of the installation packages files that corresponds to the software dependency; and direct the default installer application of the operating system to silently install the software dependency using the second one of the installation package files;

send, by the remote management service, the core installation package file to the client device; and cause the core installation package file to be installed by:
    causing a silent installation of the secondary installer application on the client device; and
    causing the installation package files to be copied to memory of the client device.

16. The system of claim 15, wherein silently installing the software dependency using the second one of the installation package files further comprises generating a command line call to the default installer application, the command line call comprising at least one command line argument that includes a path to the second one of the installation package files.

17. The system of claim 15, wherein the software dependency comprises a software library, a driver, a script, a file, or a different client application.

18. The system of claim 15, wherein identifying that the software dependency is required to be installed on the client device for execution of the client application further comprises:

identifying device state information describing a state of the client device at the at least one computing device; and determining that the software dependency is required to be installed on the client device using the device state information.

19. The system of claim 18, wherein the device state information comprises a version of an operating system on the client device, a software component installed on the client device, a hardware capability of the client device, a software capability of the client device, a hardware configuration of the client device, or a software configuration of the client device.

20. The system of claim 15, further comprising program instructions that, when executed, cause the at least one computing device to:

verify that the client application and the software dependency were installed on the client device;

after the default installer application of the operating system silently installs the client application, enroll the client device with the remote management service using the client application; and update an enrollment status for the client device stored in a data store accessible by the at least one computing device.

* * * * *